United States Patent
Lau et al.

(10) Patent No.: US 9,372,963 B2
(45) Date of Patent: Jun. 21, 2016

(54) USER DEVICE SELECTION

(75) Inventors: Priscilla Lau, Fremont, CA (US);
Mingxing S. Li, San Jose, CA (US);
Jeffrey R. Evans, Lovettsville, VA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 155 days.

(21) Appl. No.: 13/599,066

(22) Filed: Aug. 30, 2012

(65) Prior Publication Data

US 2014/0068710 A1  Mar. 6, 2014

(51) Int. Cl.
*H04L 29/06* (2006.01)
*G06F 21/00* (2013.01)
*H04L 12/64* (2006.01)
*H04L 12/66* (2006.01)

(52) U.S. Cl.
CPC ............ *G06F 21/00* (2013.01); *H04L 12/6418* (2013.01); *H04L 12/66* (2013.01)

(58) Field of Classification Search
CPC ......... H04M 7/00; H04L 12/66; G06F 15/177
USPC ................................ 709/228; 379/38, 45, 229
See application file for complete search history.

(56) References Cited

U.S. PATENT DOCUMENTS

| | | | |
|---|---|---|---|
| 8,244,204 B1* | 8/2012 | Chen ................. | H04M 3/42195 379/114.28 |
| 2003/0043992 A1* | 3/2003 | Wengrovitz .......... | H04M 7/009 379/229 |
| 2004/0141594 A1* | 7/2004 | Brunson et al. ............ | 379/88.12 |
| 2005/0181775 A1* | 8/2005 | Rideout et al. ............. | 455/414.3 |
| 2009/0129561 A1* | 5/2009 | Siegel ................. | H04M 3/4288 379/45 |
| 2009/0213761 A1* | 8/2009 | Lai ................................ | 370/254 |
| 2010/0054239 A1* | 3/2010 | Torres et al. .................. | 370/352 |
| 2010/0325249 A1* | 12/2010 | Brunson ........... | H04L 29/12122 709/221 |
| 2012/0002816 A1* | 1/2012 | Tian et al. ..................... | 380/270 |
| 2012/0195325 A1* | 8/2012 | Connelly et al. .............. | 370/432 |
| 2013/0117467 A1* | 5/2013 | Den Hartog et al. ......... | 709/244 |
| 2013/0219070 A1* | 8/2013 | Kramarenko ....... | H04L 65/1069 709/227 |

* cited by examiner

*Primary Examiner* — Peter Poltorak
*Assistant Examiner* — Huan V Doan

(57) ABSTRACT

A method may include receiving, at an application server, a session initiation protocol (SIP) message including a public user identifier (ID) associated a user. The public user ID corresponds to a plurality of user devices. The method also includes determining an applicable order of alerting at least one of the plurality of user devices. The method further includes identifying at least one available user device associated with the user, based on a terminal identifier (ID) associated with each at least one available user device. The method includes selecting a user device from the at least one available user device based on the applicable order of alerting. A SIP invite message, including a terminal ID for the selected user device, is generated. The method includes sending the SIP invite message to the selected user device based on the applicable order of alerting, and receiving a response to the SIP invite message.

15 Claims, 9 Drawing Sheets

| USER 402 | PUBLIC USER ID 404 | UE 102 | TERMINAL ID 408 |
|---|---|---|---|
| JANE DOE | 1112224444 | UE 102-1 | CELLPHONE |
| JANE DOE | 1112224444 | UE 102-2 | TABLET COMPUTER |
| JANE DOE | 1112224444 | UE 102-3 | PERSONAL COMPUTER |
| JANE DOE | 1112224444 | UE 102-4 | TELEVISION |

USER DEVICE SELECTION

BACKGROUND INFORMATION

Telephone calls are often placed across networks for different telephone companies or service providers. Call origination is the initiation, by a calling party, of a telephone call in a provider network. Call termination is the routing of the telephone call from the provider network to a called party in the same or another provider network. The called party is usually identified by a public user ID (e.g., a telephone number).

BRIEF DESCRIPTION OF THE DRAWINGS

FIG. 4 is an exemplary table of identifiers associated with user equipment in a network;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may allow assignment of a unique identifier to each user device associated with a user, in addition to a public user identifier (ID) (e.g., a telephone number) assigned for the user. Consistent with embodiments describe herein, alerts may be provided to different user devices associated with a same telephone number based on a predetermined order of alerts.

Figure 1:
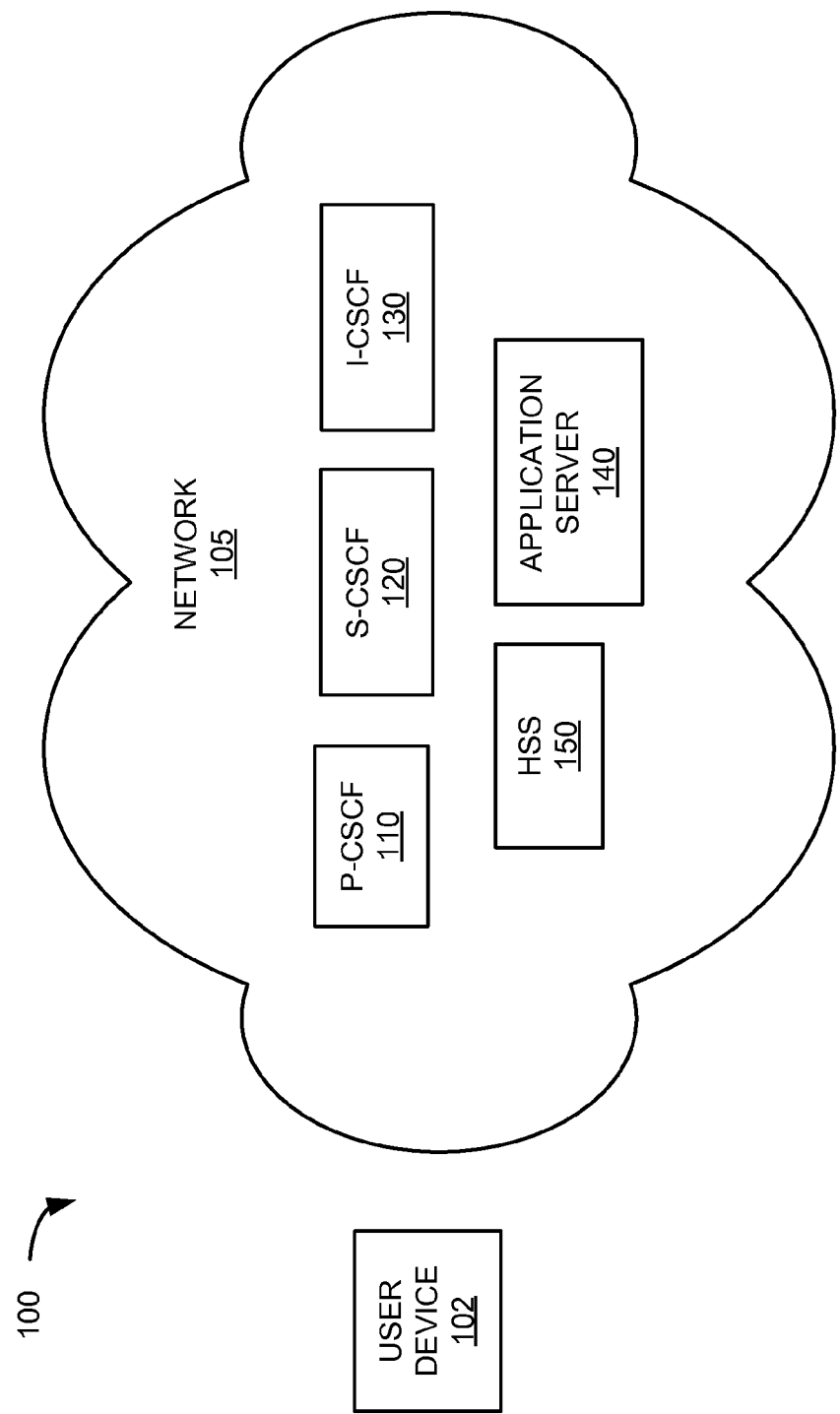
FIG. 1 illustrates an exemplary network in which systems and methods described herein may be implemented.

FIG. 1 is a block diagram of an exemplary environment 100 in which systems and methods described herein may be implemented. Environment 100 may include a network 105 and a user device 102. In an exemplary implementation, network 105 may represent a network associated with a service provider that provides various services, such as Internet-protocol (IP) related services, value added services, etc. For example, in one implementation, network 105 may represent an Internet-protocol Multimedia Subsystem (IMS) network that provides services to IMS subscribers (referred to herein as subscribers). The exemplary configuration illustrated in FIG. 1 is provided for simplicity. It should be understood that a typical environment may include more or fewer components than illustrated in FIG. 1. For example, although a single user device 102 is shown, environment 100 may include large numbers of user devices 102 (e.g., thousands or millions of user devices 102). Additionally, environment 100 may include a number of other networks.

User device 102 (referred to singularly as user device 102, in plural as user devices 102 or generally as user devices 102) may include any type of device that is able to transmit and receive data, such as text data, video data, image data, audio data, multi-media data, etc. For example, user devices 102 may include some type of computer, such as a personal computer (PC), a tablet computer, a laptop computer, etc., a personal digital assistant (PDA), a web-based appliance, a mobile terminal (e.g., a cellular telephone), etc. User devices 102 may also include a telephone, such as a public switched telephone network (PSTN) based telephone, an Internet-protocol (IP) based phone, a wireless telephone, etc., used to make and receive telephone calls. User device 102 may be a subscriber to telephony services provided in association with network 105.

Network 105 may include one or more wired, wireless and/or optical networks that are capable of receiving and transmitting data, voice and/or video signals, including multi-media signals that may include voice, data and video information. For example, network 105 may include one or more public switched telephone networks (PSTNs) or other type of switched network. Network 105 may also include one or more wireless networks and may include a number of transmission towers for receiving wireless signals and forwarding the wireless signals toward the intended destinations. Network 105 may further include one or more satellite networks, one or more packet switched networks, such as an IP-based network, a local area network (LAN), a wide area network (WAN), a personal area network (PAN) (e.g., a wireless PAN), an intranet, the Internet, or another type of network that is capable of transmitting data.

Network 105 may include call session control components used to process calls in network 105 (e.g., calls to/from IMS subscribers). For example, network 105 may include proxy call session control function (P-CSCF) 110, serving call session control function (S-CSCF) 120, and interrogating call session control function (I-CSCF) 130. P-CSCF 110 may store the address (such as a packet data network (PDN) gateway (PGW) address and an IP address of user device 102) so that the IMS network can reach each user device 102 individually. Network 105 may also include an application server 140 and a home subscriber server (HSS) 150.

P-CSCF 110, S-CSCF 120, and I-CSCF 130 may perform session control processing and may be responsible for parsing a session (e.g., a session initiation protocol (SIP) session) and applying logic (e.g., business logic, service logic, operational logic, etc.) on a per call/session or per event basis. The outcome of the session control processing may be to route call/session to the appropriate devices (e.g., application server 140) inside or outside of network 105 and/or manipulate SIP headers and values of the SIP signaling messages.

P-CSCF 110 may act as the main point of contact for connections to user devices (not shown in FIG. 1) associated with subscribers of the IMS (referred to herein as subscribers or IMS subscribers). For example, P-CSCF 110 may validate requests from user devices 102, forward the requests to selected destinations, process and forward the responses, etc. P-CSCF 110 may also generate chargeable events and send information relating to the chargeable events to a billing system (not shown).

S-CSCF 120 may perform session control and registration services for user devices 102 of the IMS network/platform (e.g., network 105). S-CSCF 120 may receive a user profile from another device, such as HSS 150 and route sessions requested by a subscriber (e.g., user device 102). Additionally, S-CSCF 120 may perform user authentication for subscribers. S-CSCF may also generate charging data for a call/session or event.

I-CSCF 130 may act as a main point of contact for connections to subscribers (user devices 102) served by other networks, such as other IP networks (e.g., a network external to network 105). I-CSCF 130 may function to identify the S-CSCF 120 that serves the called party. I-CSCF 130 may perform this function for both internally generated calls (e.g., subscriber calls) and for externally generated calls (e.g., non-subscriber calls). For example, S-CSCF 120 may receive a subscriber call forwarded via P-CSCF 110, generate a number mapping query, such as an E.164 number mapping (ENUM, as defined by the International Telecommunication Union (ITU)) query to an ENUM server (not shown), and receive a response identifying a particular I-CSCF 130 for the called user. S-CSCF 120 that serves the calling user may forward the call to the identified I-CSCF 130 that serves the called user. If HSS 150 is available, I-CSCF 130 may perform an HSS query and identify, for example, S-CSCF 120 as the CSCF component serving the called party and forward the call to S-CSCF 120.

In an exemplary implementation, P-CSCF 110, S-CSCF 120 and I-CSCF 130 may be implemented in a single device. Alternatively, P-CSCF 110, S-CSCF 120, and I-CSCF 130 may be implemented using separate network elements/devices. In one implementation, S-CSCF 120 may be viewed as the "brain" (i.e., a central decision making/processing point (or device) in network 105) of the call session control components (i.e., P-CSCF 110, S-CSCF 120 and I-CSCF 130). The call session control components may also interact with HSS 150 and/or other elements associated with providing IMS related services.

Application server 140 may be a network device or server (or application, group of servers, etc.), such as a telephony application server (TAS), short message service center (SMSC), chat server, etc., which implements applications for a subscriber in network 105. For example, application server 140 may perform call processing associated with calls from subscribers, such as a subscriber associated with user device 102. Application server 140 may perform one or more lookups to identify information associated with routing calls based on the location of the caller. Application server 140 may perform supplemental/additional services, such as functions indirectly related to call or message routing in network 105 (e.g., video voicemail, text messaging, etc.).

HSS 150 may include a master user database that supports devices that handle calls, such as application server, call session call control function, proxy devices, session border controllers, etc. HSS 150 may contain subscription-related information (e.g., subscriber profiles), and may perform authentication and authorization of a user device 102 based on requests received from an associated device, such as a mobile management entity (not shown, e.g., a key control node responsible for idle mode tracking and paging procedure in a long term evolution (LTE) network) or application server 140. HSS 150 may provide information about a network location and Internet protocol (IP) address of user devices 102 to other devices in network 105.

It should be understood that network 105 may include additional elements that aid in routing calls and providing services to customers. In addition, functions described as being performed by one of the elements in FIG. 1 may alternatively be performed by another element or multiple elements. In addition, although the various devices illustrated in FIG. 1 are shown as separate devices, in other implementations, the functions performed by two or more of these devices may be performed by a single device or platform. Still further, additional connections (not shown) between the components of FIG. 1 may exist. Network 105 may also include additional elements, such as switches, routers, gateways, backend systems, etc., that aid in routing calls and/or session information in network 105 and providing services to parties associated with user devices 102.

Figure 2:
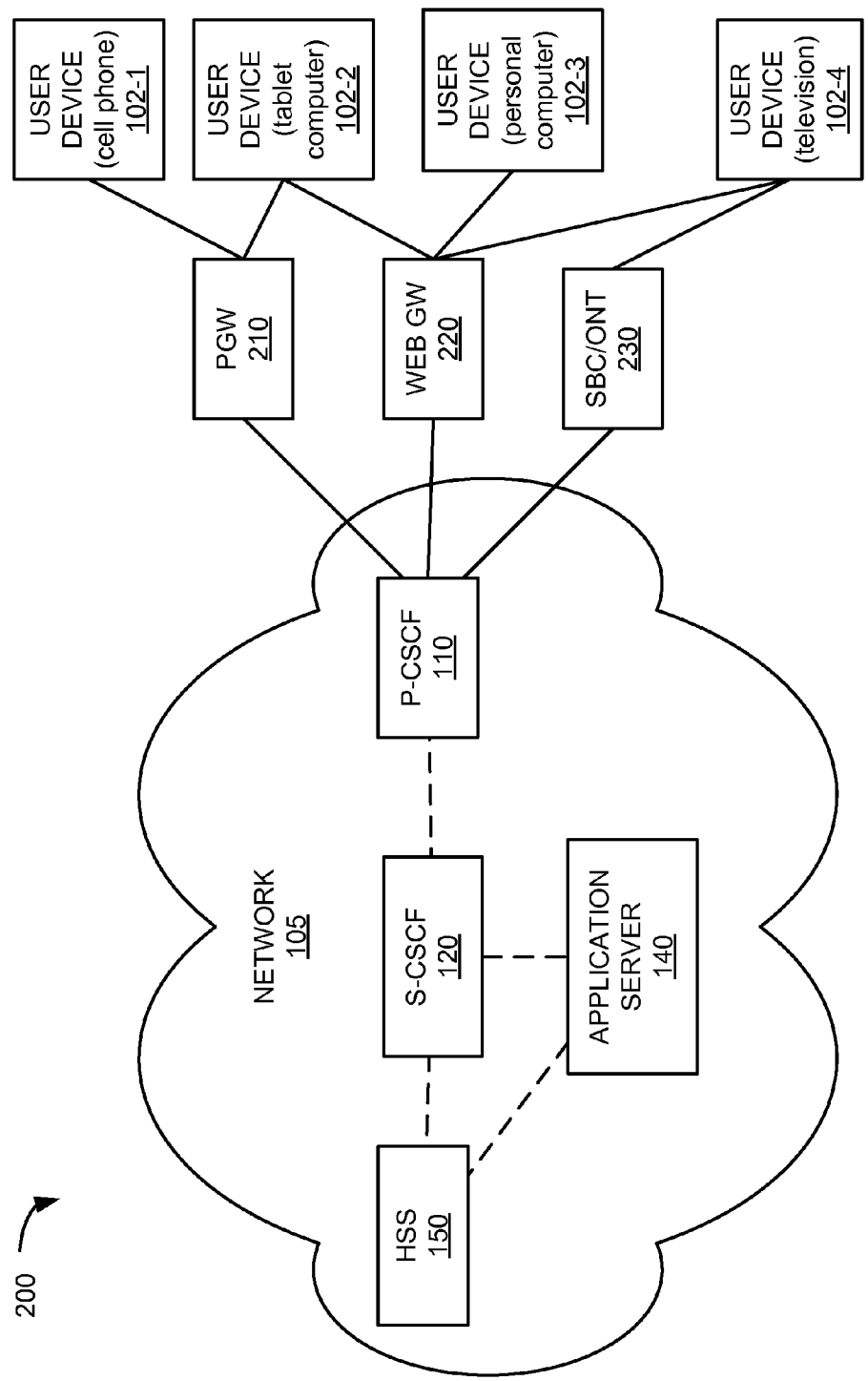
FIG. 2 illustrates an exemplary environment including user equipment associated with a user in a network.

FIG. 2 is a block diagram of an exemplary environment 200 in which systems and methods described herein may be implemented. FIG. 2 illustrates a portion of network 105 consistent with implementations described herein. As illustrated in FIG. 2, exemplary environment 200 may include a plurality of user devices 102-1 through 102-4, a PDN gateway (PGW) 210, an Internet ("worldwide web") gateway (Web GW) 220, a session border controller (SBC)/optical network terminal (ONT) 230, and network 105.

As shown in FIG. 2, user devices 102 may connect to network 105 through different gateways, such as PGW 210, Web GW 220, and/or SBC/ONT 230, based on configuration/capability of the different user devices 102. A gateway is a network point that acts as an entrance or exit to or from a network. User devices 102-1 through 102-4 may be different devices associated with a same user. For example, user device 102-1 may be a cell phone, which may communicate with network 105 through PGW 210, user device 102-2 may be a tablet computer, which may communicate with network 105 through PGW 210 and/or Web GW 220 (e.g., LTE and WiFi), user device 102-3 may be a personal computer, which may communicate with network 105 through Web GW 220 (i.e., user device 102-3 may use the Internet and a data network to reach a Web GW 220 that connects to network 105), and user device 102-4 may be a television, which may communicate with network 105 through Web GW 220 and/or SBC/ONT 230.

Implementations described herein relate to providing a unique terminal ID (hereinafter referred to as a terminal ID) for user devices 102 in addition to a unique public user ID assigned in association with the user (e.g., a telephone number, a SIP uniform resource identifier (URI), a telephone (Tel) URI, a common name, an email address, etc.) in network 105. Each user device 102 may be assigned a unique terminal ID that may be used by components of network 105 to identify the user device 102. The unique terminal ID may be an Internet protocol (IP) address, a media access control (MAC) address, a device type (such as cell phone, tablet, computer, TV, etc.), or other identifying aspect associated with each user device 102 that may allow network 105 to distinctly address and communicate with user device 102 or a class/group/of devices of which user device 102 is a member.

Telephony services may be applied by components of network 105 based on a combination of the terminal ID and the user ID.

Figure 3:
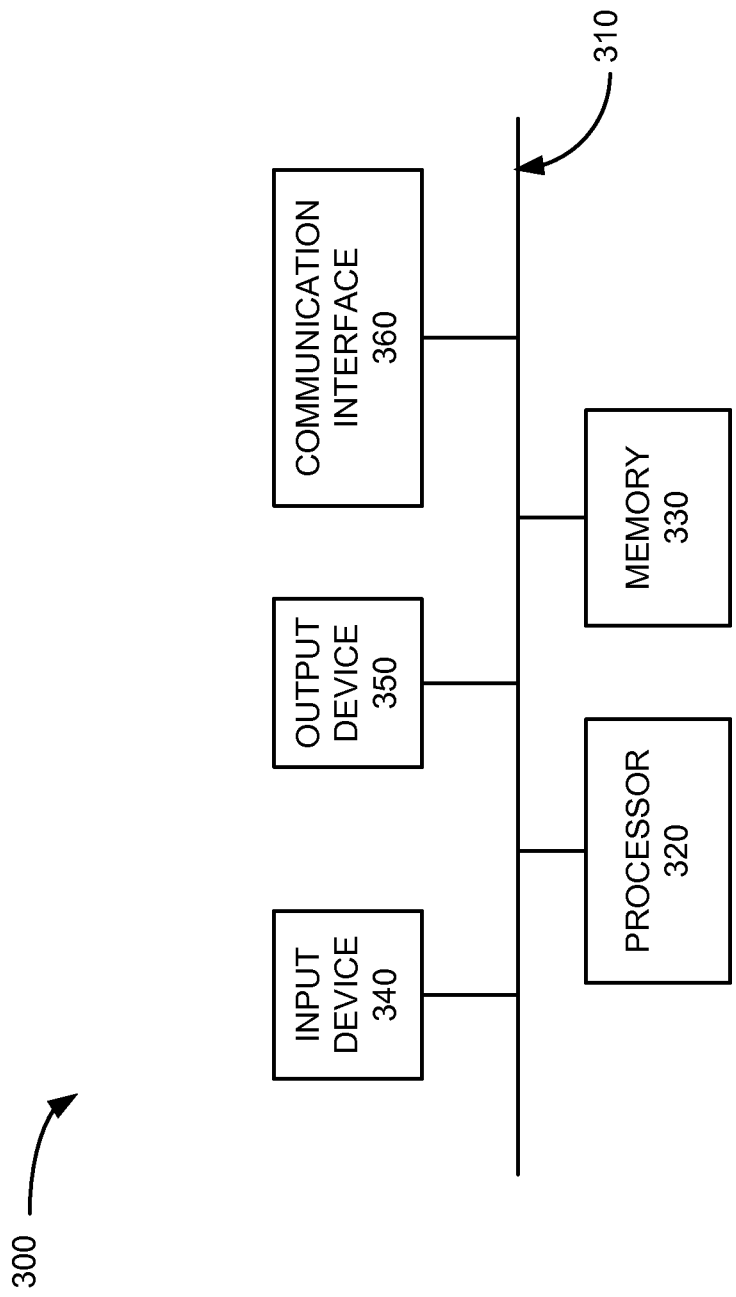
FIG. 3 illustrates an exemplary configuration of one or more of the components of FIGS. 1 and/or 2.

FIG. 3 is a diagram of exemplary components of a device 300 that may correspond to user devices 102, P-CSCF 110, S-CSCF 120, I-CSCF 130, application server 140, HSS 150 or additional devices (not shown) in network 105. Each of user devices 102, P-CSCF 110, S-CSCF 120, I-CSCF 130, application server 140, and HSS 150 may include one or more devices 300. As shown in FIG. 3, device 300 may include a bus 310, a processor 320, a memory 330, an input device 340, an output device 350, and a communication interface 360.

Bus 310 may permit communication among the components of device 300. Processor 320 may include one or more processors or microprocessors that interpret and execute instructions. In other implementations, processor 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processor 320, a read only memory (ROM) or another type of static storage device that stores static information and instructions for the processor 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include mechanisms for communicating with other devices, such as other devices of network 105.

As described herein, device 300 may perform certain operations in response to processor 320 executing machine-readable instructions contained in a computer-readable medium, such as memory 330. A computer-readable medium may include a non-transitory memory device. A memory device may include space within a single physical memory device or spread across multiple physical memory devices. The machine-readable instructions may be read into memory 330 from another computer-readable medium or from another device via communication interface 360. The machine-readable instructions contained in memory 330 may cause processor 320 to perform processes described herein. Alternatively, hardwired circuitry may be used in place of or in combination with machine-readable instructions to implement processes described herein. Thus, implementations described herein are not limited to any specific combination of hardware circuitry and machine-readable instructions.

FIG. 4 is an exemplary terminal ID table 400 of identifiers associated with user devices 102 in network 105. Table 400 includes identifiers for multiple user devices 102 associated with a single user 402, who has been assigned a single public user ID 404, in network 400.

As shown in table 400, a same user 402 ("Jane Doe") is associated with each record in table 400. Jane Doe is assigned a public user ID 404 (shown as 1112224444, second column of table 400) in table 400 (for network 105). Additionally, each user device 102 associated with public user ID 404 (e.g., user devices 102-1 to 102-4, shown in the third column of table 400) may be assigned a unique terminal ID 408. The third column of table 400 is shown to illustrate the different user devices 102 associated with the user (such as shown in FIG. 2) and other embodiments may not include this information.

Terminal ID 408 may be included in a (in some instances) proprietary SIP header for signaling messages associated with the particular user device 102. For example, terminal ID 408 may be included in SIP signaling messages, such as SIP Register, SIP Invite, 180, 183, 200 OK, and SIP ACK, etc., when user device 102 communicates with network 105. Network elements in network 105 (e.g., P-CSCF 110, S-CSCF 120, I-CSCF 130, application server 140, etc.) may identify separate user devices 102 associated with a user by the combination of a public user ID 404 (e.g., a E.164 telephone numbers and other device identifiers; such as a mobile subscriber integrated digital services network number (MSISDN), SIP URI, TEL URI etc.); and a terminal ID 408.

Terminal ID 408 may be determined based on a factor that is unique to a user device 102 or a group of user devices 102 that are to be addressed in network 105, such as the type of device corresponding to user device 102, such as a cell phone (user device 102-1), a landline phone, tablet computer (user device 102-2), a laptop or desktop computer (user device 102-3), a TV set (user device 102-4), (shown in table 400). In other instances, terminal ID 408 may be determined based on the IP address used by a particular user device 102 to communicate with network 105, the MAC address of user device 102, the access technology, etc. In further instances, terminal ID 408 may be a representation in numeric, character, alphanumeric, or may be other machine-readable identifier (i.e., a unique identifier) that is assigned to user device 102.

Table 400 represents identifiers (i.e., public user ID 404 and terminal ID 408) associated with a single user in network 105. Each distinct user in network 105 may have associated information similar to identifiers associated with the user ("Jane Doe") in table 400.

Figure 5:
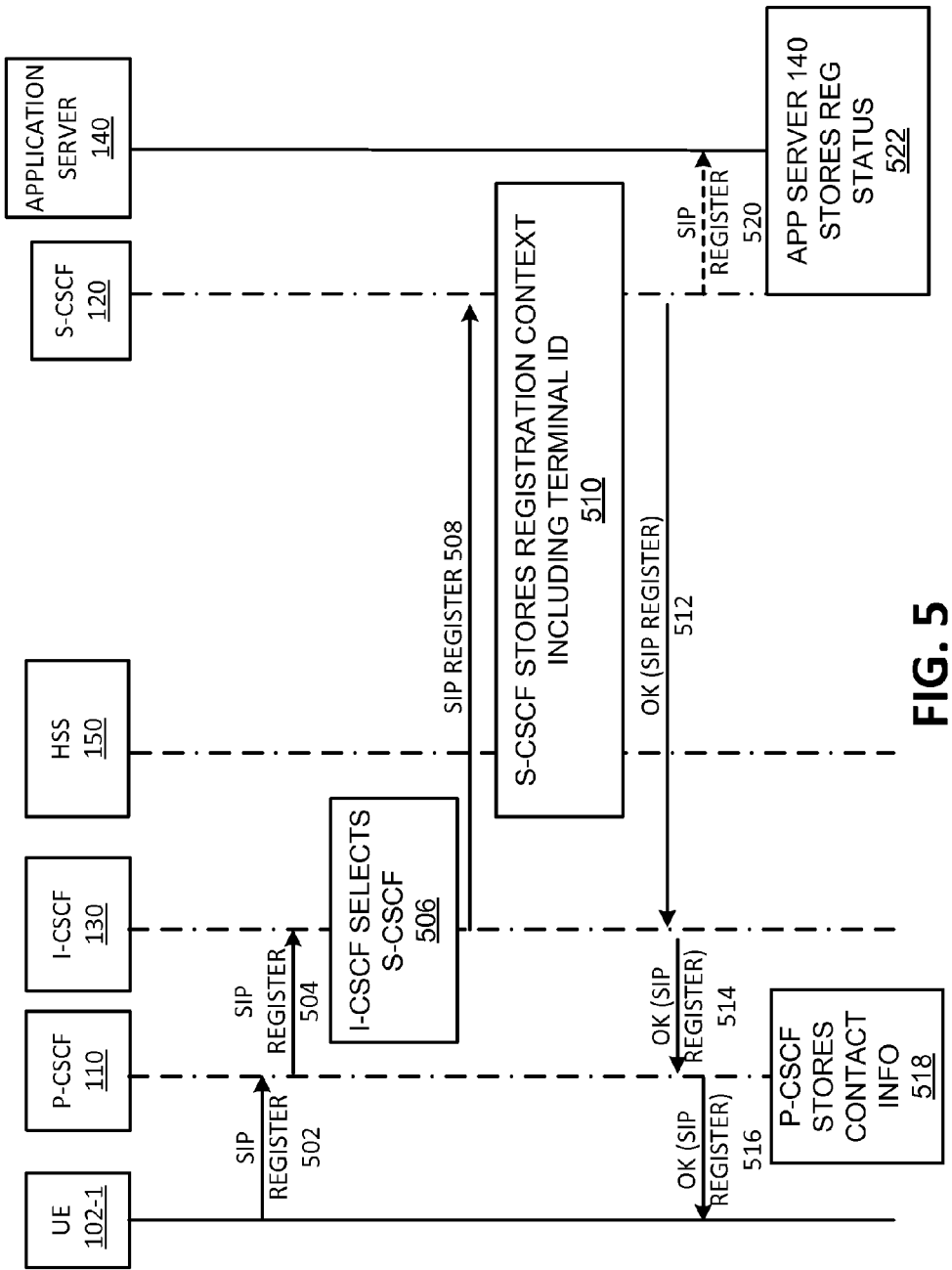
FIG. 5 is a signal diagram of exemplary dialogs implementing session initiation protocol (SIP) registration with a terminal identifier (ID) in a network.

FIG. 5 illustrates a signal diagram 500 of exemplary dialogs implementing SIP registration with terminal ID 408 in network 105. As illustrated, signal diagram 500 may include signaling and transactions between user device 102, P-CSCF 110, S-CSCF 120, I-CSCF 130, application server 140, and HSS 150. Additionally, signal diagram 500 includes determinations made at particular components of network 105. The signaling, transactions and determinations illustrated in FIG. 5 are for illustrative purposes only. Other signaling, transactions and determinations may be implemented. Therefore, signal diagram 500 may include additional, fewer and/or different components and/or transactions than those depicted in FIG. 5. Also, in some instances, one or more of the components of signal diagram 500 may perform one or more signaling, transactions or determinations described as being performed by another one or more of the components of signal diagram 500.

As shown in FIG. 5, user device 102-1 may send a SIP register message (that includes a proprietary SIP terminal ID header containing terminal ID 408) to P-CSCF 110 (signal flow 502). P-CSCF 110 may select I-CSCF 130 based on a home domain within the SIP register message. P-CSCF 110 may forward the SIP register message to the selected I-CSCF 130 (signal flow 504).

I-CSCF 130 may select an S-CSCF 120 to forward the SIP register message (determination 506). For example, I-CSCF 130 may send a diameter location information request (LIR) or a diameter subscriber data request (SDR) to HSS 150, requesting the address of a serving S-CSCF 120 assigned to user device 102 and other information. I-CSCF 130 may select the S-CSCF 120 for the user after querying HSS 150 (e.g., based on information provided from HSS 150 in a diameter location information answer (LIA) message) or a diameter subscriber data answer (UDA) message (not shown in FIG. 5). I-CSCF 130 may forward the SIP register message (including terminal ID 408) to the selected S-CSCF 120 (signal flow 508).

S-CSCF 120 may determine and store registration context including terminal ID 408 for user device 102-1 (determination 510). For example, S-CSCF 120 may send a diameter multimedia-auth-request (MAR) requesting authentication and subscriber information from HSS 150. S-CSCF 120 may authenticate user device 102 by sending a SIP 401 challenge to user device 102-1 using the authentication information returned from the HSS 150 in a diameter multimedia-auth-answer (MAA) message. If authentication of user device 102-1 is successful, S-CSCF 120 may send a SIP 200 OK message to user device 102-1 (signal flows 512, 514, and 516) via I-CSCF 130 and P-CSCF 110. S-CSCF may store the registration context for user device 102-1 including P-CSCF 110 address, public user ID 404, terminal ID 408 and a registration status of user device 102-1 in such way that information may be retrieved by the combination of public user ID 404 and terminal ID 408. S-CSCF 120 may send a diameter server assignment request (SAR) message to HSS 150 and HSS 150 may respond with a diameter server assignment answer (SAA) to S-CSCF 120 (not shown in FIG. 5). As a result, all further registrations from other user device 102 associated with the same public user ID 404 may be directed by I-CSCF 130 to the same S-CSCF 120. In instances of a successful registration, S-CSCF 120 may send a SIP 200 OK message to user device 102-1 via I-CSCF 130 (signal flow 512) and I-CSCF 130 may forward the SIP 200 OK to P-CSCF 110 (signal flow 514). P-CSCF 110 may forward the SIP 200 OK to user device 102-1 (signal flow 516) and store the contact info (e.g., IP device addresses in the contact header in the SIP register message, the PGW address) and the serving S-CSCF info (determination 518) in such a way that P-CSCF 110 may be capable of "looking up" (i.e., locating) the information by the combination of the public user ID 404 and the terminal ID 408 originally provided by user device 102-1 in the SIP register message.

S-CSCF 120 may identify and maintain the registration status of user devices 102 separately based on a combination of a terminal ID 408 and public user ID 404. S-CSCF 120 may support different authentication schemes or registration periods for different devices (user devices 102-1), for example based on particular configuration/capabilities (e.g., associated network gateways) of user devices 102 and network components.

If terminal ID 408 is based on device type, and the authentication method and registration period are also based on device type for all subscribers in network 105, then S-CSCF 120 may store the authentication scheme per device type locally and may apply the same authentication scheme for the same terminal ID 408 (and corresponding rules) for all subscribers in network 105 (i.e., based on general information/attributes that are not specific to a particular user or user device 102). If terminal ID 408 is based on different device attributes or unique for each subscriber, S-CSCF 120 may store information for each user device 102 in HSS 150 and S-CSCF 120 may download the information during SIP Registration procedures. In this case, S-CSCF may insert the terminal ID 408 in a new attribute-value-pair (AVP) in a diameter multimedia-auth-request (MAR) message to HSS 150 so that HSS 150 may send back the appropriate authentication scheme to S-CSCF 120.

S-CSCF 120 may send a third party SIP registration message with the new SIP terminal ID header containing terminal ID 408 to application server 140 (signal flow 520) after each successful registration by a user device 102. S-CSCF 120 may assign the same application server 140 for all user devices associated with the same public user ID 404. Application server 140 may store the registration status received from S-CSCF 120 separately for each unique combination of public user ID 404 and terminal ID 408.

In instances (i.e., configurations/implementations of signaling in network 105) in which information specific to the user or user devices 102 is required, application server 140 may download the required subscriber profile data from HSS 150. In some implementations, a common subscriber profile may apply to all devices belonging to the same user. In this case, application server 140 may not indicate the terminal ID information to HSS 150. In other implementations, a different subscriber profile may apply to different terminal IDs 408. Depending on whether there is a common or separate subscriber profiles for different terminal ID 408, application server 140 may send the terminal ID to the HSS 150 when downloading the subscriber profile from HSS 150. If necessary, application server 140 may insert a new attribute value pair (AVP) containing the appropriate terminal ID 408 in a diameter user data request (UDR) message to HSS 150, so that HSS 150 may return the appropriate subscriber profile in a diameter user data answer (UDA) message to application server 140. In instances in which the subscriber has different service attributes for different user devices 102, application server 140 may apply the appropriate service attributes to the different user devices 102 based on terminal IDs 408 associated with the user devices 102.

Figure 6:
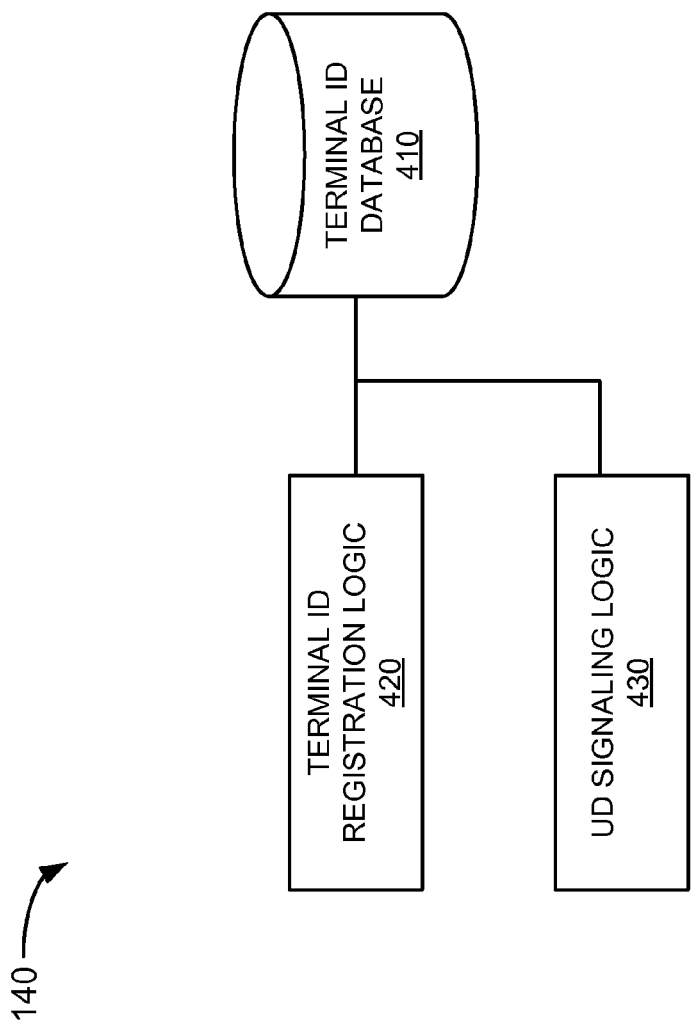
FIG. 6 is an exemplary functional block diagram of an application server.

FIG. 6 is an exemplary functional block diagram of application server 140 according to an exemplary implementation. The logical blocks illustrated in FIG. 6 may be implemented in machine-readable instructions, hardware, or a combination of hardware and machine-readable instructions. For example, in one implementation, all or some of the logical blocks illustrated in FIG. 6 may be implemented by processor 320 (FIG. 3) executing machine-readable instructions stored in, for example, memory 330. Functions associated with application server 140 are described with respect to FIG. 4 and terminal ID table 400.

Terminal ID database 410 may include records of user devices 102 (associated with a particular user) that are currently registered with network 105, for example as shown in table 400. The records may include a public user ID 404 for the user and a terminal ID 408 for each user device 102. Additionally, terminal ID database 410 may include a registration status indicator (not shown) and subscriber profile data including data downloaded from the HSS 150, for each user device 102. The registration status indicator may identify a status of registration of each user device 102, including a time of expiration of the SIP registration.

Terminal ID registration logic 420 may receive third party SIP registration information associated with user devices 102 and may determine a registration status of each user device 102 based on predetermined rules for network 105 (e.g., user devices 102 that do not respond are to be considered inactive or unavailable) and information contained in SIP messages received in association with user devices 102. Terminal ID registration logic 420 may update entries in terminal ID database 410 based on the third party SIP registration messages (received from S-CSCF 120 in association with user devices 102) and predetermined rules/conditions for network 105.

User device (UD) signaling logic 430 may determine which of multiple user devices 102 associated with a user are to be provided with particular subscribed applications in a particular order of alerts. UD signaling logic 430 may determine an order of alerts for user devices 102 based on subscriber profile and current registration status stored in terminal ID database 410 of user devices 102 and based on information received in the signaling message (e.g., call type indicated by the SDP in the SIP invite message). For example, if a user has three user devices 102; such as a cell phone, a tablet computer, and a television, and the user turns on only his/her cellphone while the other user devices 102 are powered off, the cell phone will be the only user device 102 registered with network 105. At this time, if a call arrives for the user, UD signaling logic 430 may determine that there is only one user device 102 (i.e., the cell phone) identified by the received terminal ID 408 that is available to receive the call for user's public user ID 404 (e.g., telephone number).

In another instance, additional user devices 102 may be available in network 105, e.g., if the user also turns on user device 102-2 (i.e., his tablet computer) and user device 102-2 performs registration successfully with network 105 using its own terminal ID 408. S-CSCF 120 and UD signaling logic 430 may "be aware" (i.e., have information indicating) that user now has more than one user device 102 (in this instance two user devices 102) that may receive calls intended to the same public user ID 404. When more than one user device 102 is registered with network 105, an incoming call/session may be provided to user devices 102 based on an applicable order of alerts determined by UD signaling logic 403. The applicable order of alerts may be based on information included in network 105 and apply to all user device 120. In this case, the application order may be stored locally in application server 140. Alternatively, it may be based on user preference and may be included as part of the subscriber profile data for a user device 120. In this case, an applicable order may be downloaded by application server 140 from HSS 150.

According to one implementation, network 105 may alert both user devices 102 at a same time (i.e., approximately parallel) and wait for the user to decide which user device 102 he/she will use to join the call/session. The alerting of user devices 102 in this instance may be referred to as parallel alerting or simultaneous alerting.

According to another implementation, network 105 may alert user devices in a sequential order based on a predetermined ordered list of user devices 102. Network 105 may first alert one user device 102 (e.g., user device 102-1) and if that user device 102-1 rejects the incoming call/session or does not answer/respond within a first predetermined time, then network 105 may alert a second user device 102 (e.g., user device 102-2) from the predetermined ordered list of user devices 102. If the second user device 102 rejects the incoming call/session or does not respond within a second predetermined time, then network 105 may alert a third device predetermined ordered list of user devices 102, etc. The alerting of user devices 102 in this instance may be referred to as sequential alerting. The order of sequential alerting based on the predetermined ordered list of user devices 102 may be static (i.e., the predetermined order remains the same from call/session to call/session until input is received from an administrator/user via network 105).

According to another implementation, network 105 may alert user devices in a sequential order based on predetermined attributes associated with user devices 102 in network 105, such as based on a service type, a device type, a type of network gateway, etc. For example, if the predetermined attribute is a service type and the call is a voice only call, the sequential order may be cell phone first, tablet computer second, and television set last (i.e., based on voice call capabilities of available user devices 102). If the call is a video call, then the sequential order may be television set first, tablet computer second, and then cell phone (i.e., based on video capabilities of available user devices 102). If the call is for setting up a chat session, then the sequential order may be tablet first, cell phone second, and then television (i.e., based on relative chat session capabilities of available user devices 102). Similarly, sequential order may be determined based on multimedia capability, text capability, etc., associated with user devices 102.

The predetermined ordered list of user devices 102 and/or predetermined attributes associated with user devices 102 may be stored as part of subscriber data in HSS 150, and application server 140 may download a sequential order and/or information that may be used to determine a sequential order (i.e., the predetermined ordered list of user devices 102 and predetermined attributes associated with user devices 102) and may store the information related to the sequential orders locally during the registration period of the user devices 102.

According to an implementation, application server 140 may override a sequential order based on an emergency override indicator, during a 911 callback period which starts at the end of a 911 call and lasts for a predetermined interval configured by network provider of network 105. Emergency override indicator may either be managed by application server 140 or by S-CSCF 120, depending on whether application server 140 takes part in processing 911 calls in network 105. For example, if the user makes an emergency call (e.g., 911 call) using user device 102-3 (i.e., personal computer) and application server 140 is involved in processing the call, application server 140 may store terminal ID 408 sent in a SIP invite message for the 911 call for a predetermined period of time ("callback period") after the end of the 9111 call. If a call is received for the public user ID 404 later during the callback period, application server 140 may override the applicable sequential order and send any incoming calls to user device 102-3 based on the stored terminal ID 408 first. As a result, if the incoming call is a 911 call back from a public safety answering point (PSAP), the call will be delivered promptly to the correct user device that has made the 911 call.

According to an implementation, application server 140 may not handle 911 calls from user device 120 and S-CSCF 120 may deliver the 911 call to PSAP while bypassing the normal call processing procedure executed by application server 140. In this instance, S-CSCF 120 may store the terminal ID that is associated with the 911 call and manage the callback period. When a new call arrives for the public user ID of a user device 102 that has made an emergency call and the callback period has not expired, S-CSCF 120 may insert a proprietary emergency override SIP header (e.g., a header unique to network 105) containing the terminal ID 408 of the user device 120 that has made the emergency call in the SIP invite message sent to application server 140. Upon receiving the emergency override SIP header, application server 140 may override the applicable order of sequential alerting list and alert the user device 120 identified by the terminal ID 408 included in the emergency override SIP header.

Application server 140 may replace the emergency override SIP header with the SIP terminal ID header containing the terminal ID 408 from the SIP emergency override SIP header in the SIP invite message and send it back to S-CSCF 120 for call termination. S-CSCF 120 may forward the SIP invite message to P-CSCF 110 according to early registration from user device 120 by the combination of the public user ID 404 (found in the request URI in the SIP invite message) and terminal ID 408 (found in the SIP Terminal ID header in the SIP invite message). P-CSCF 110 may deliver the SIP Invite message to user device 102 according to the contact information stored during early registration by user device 102 based on the combination of public user ID 404 and terminal ID 408. In this instance, P-CSCF 110 may deliver the call back to the correct user device 102 if this is a 911 call back from a public safety answering point (PSAP).

Figure 7:
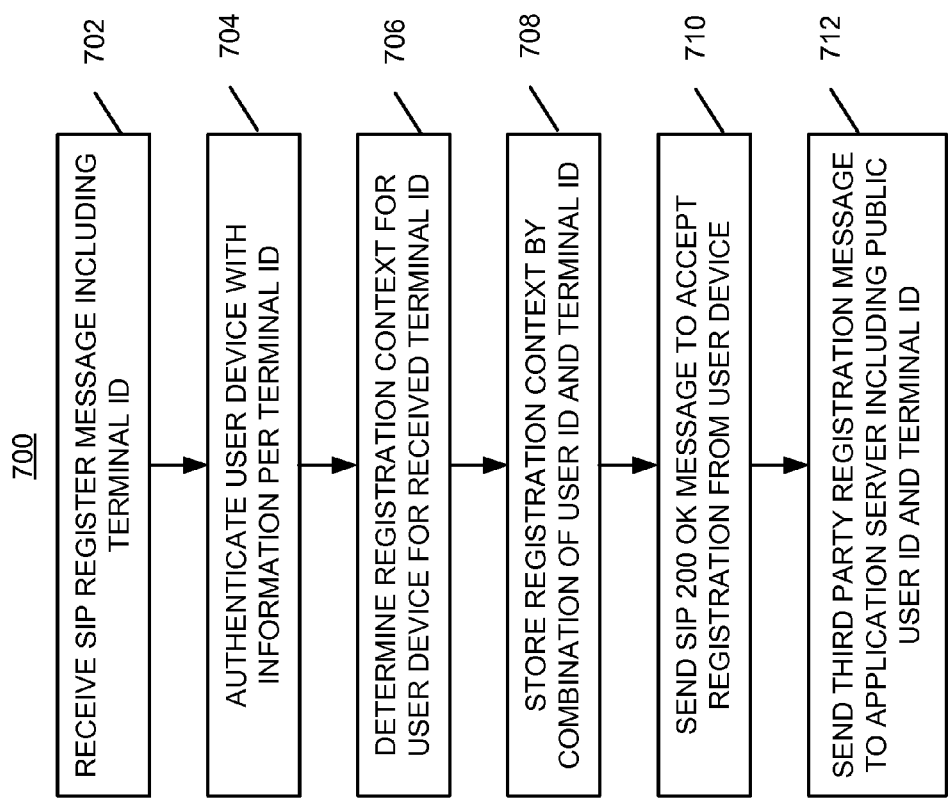
FIG. 7 is a flow diagram illustrating SIP registration with a terminal identifier (ID) in a network.

FIG. 7 is a flow diagram illustrating exemplary processing associated with implementing SIP registration with terminal ID 408 in network 105. In one implementation, process 700 may be performed by S-CSCF 120. In another implementation, some or all of process 700 may be performed by another device or group of devices, including or excluding S-CSCF 120.

At block 702, S-CSCF 120 may receive a SIP register message that includes a terminal ID 408 from user device 102.

For example, user device 102 may send a SIP register message that includes a terminal ID header that identifies terminal ID 408 of user device 102, and a public user ID 404 associated with the user to register its presence in network 105. Terminal ID 408 may identify attributes associated with user device 102, such as a device type, a type of network gateway associated with user device 102, particular capabilities of user device 102 (e.g., video display, resolution, etc.), etc.

At block 704, S-CSCF 120 may authenticate user device 102. For example, S-CSCF 120 may communicate with HSS 150 to retrieve authentication information and other data applicable to user device 102. S-CSCF 120 may send terminal ID 408 to HSS 150 if authentication method and/or other data applicable to user device 102 are different depending on terminal ID 408. Alternatively, if information and data returned by HSS 150 are the same, regardless the terminal ID 408, for a user device 102, then S-CSCF 120 may not have to send the terminal ID 408 to HSS 150.

S-CSCF 120 may create a registration context (e.g., registration status, contact information (e.g., P-CSCF 110 address), Initial Filter Criteria (iFC) documents applicable to providing IMS services, etc.) for user device 102 based on the combination of terminal ID 408 and public user ID 404 received in the SIP register message (block 706). When a different device of the same use device 102 registers later, S-CSCF 120 may create a separate registration context for the new combination of terminal ID 408 and public user ID 404. After creating the registration context of a user device 102, S-CSCF 120 may store the information so that it can be retrieved by the combination of terminal ID 408 and public user ID 404 of user device 102 (block 708).

At block 710, S-CSCF 120 may send a 200 OK message to user device 102 that sent the SIP register message from block 702. S-CSCF 120 may send a third party registration message (e.g., a SIP register message) to application server 140 (block 712). The third party registration message may include terminal ID 408, public user ID 404 (e.g., MSISDN), and/or other information (e.g., IMSI) of user device 102. Application server 140 may process the third party registration message for the subscriber as described below with respect to FIG. 8 and process 800.

Figure 8:
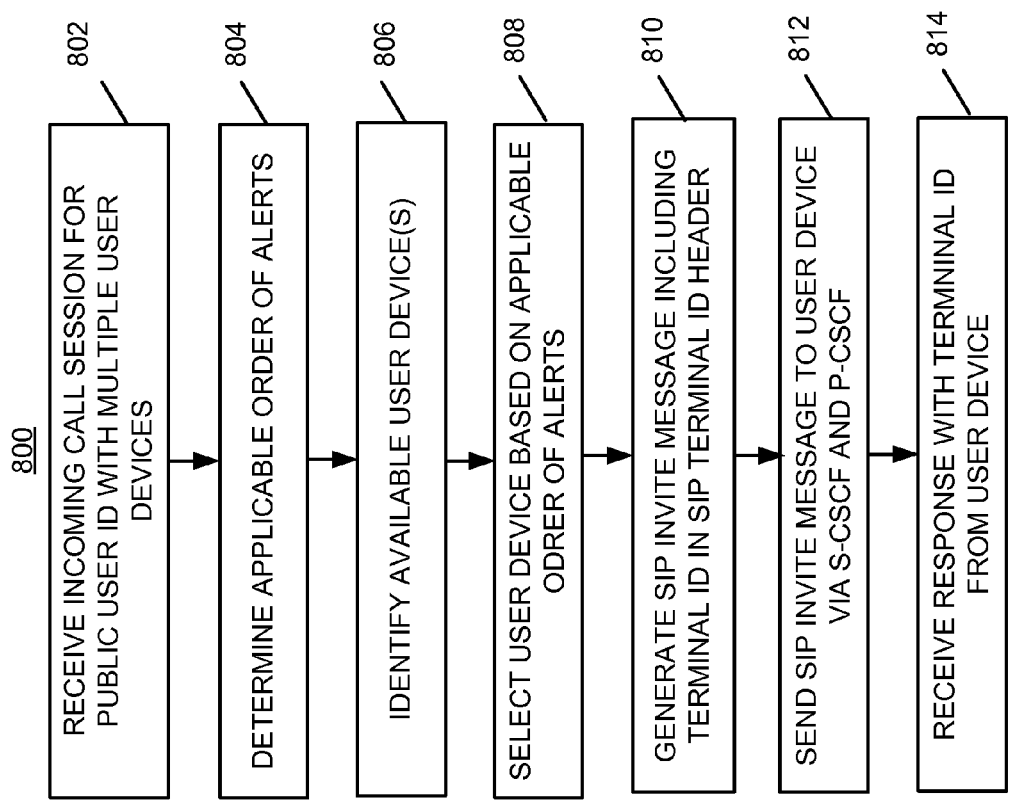
FIG. 8 is a flow diagram illustrating exemplary processing associated with user device selection in a network.

FIG. 8 is a flow diagram illustrating exemplary processing associated with user device selection in network 105. In one implementation, process 800 may be performed by application server 140. In another implementation, some or all of process 800 may be performed by another device or group of devices, including or excluding application server 140.

Application server 140 may receive a SIP invite message from an S-CSCF 120 indicating an incoming call for a user (block 802). For example, application server 140 may receive a SIP invite with a request URI containing the user's public ID 404 (e.g., telephone number). Application server 140 may determine whether the incoming call can be delivered to the called user based on a service profile (e.g., associated with the called user). For example, whether calls from the originating caller is acceptable by the called user.

If application server determines that the call is to be terminated to the called user, and the called user has multiple user devices associated with the same called public user ID 404, application server 140 may determine an applicable order of alerting user devices 102 associated with the user. For example, application server 140 may identify an applicable order of alerting user devices 102 based on general information applicable to all users. Alternatively, application server 140 may identify an applicable order of alerting user devices 102 based on subscriber profile information. For example, application server 140 may download or access the subscriber profile from HSS 150 by sending a diameter user data request (UDR) signaling message with user ID 404 with terminal ID 408, if needed, and HSS 150 may respond with a diameter user data answer (UDA) signaling message. The subscriber profile information may include the applicable order of alerts, such as parallel alerts, a sequential order of alerts based on a predetermined ordered list of user devices 102, or a sequential order of alerts based on predetermined attributes (e.g., time of day, the type of IMS services, etc.), or a combination of attributes.

Application server 140 may identify available user devices 102 associated with the public user ID (block 806). For example, application server 140 may determine user devices 102 associated with the user that are currently registered with network 105. The available user devices 102 may have been previously registered with application server 140, such as at block 712 of process 700 described with respect to FIG. 7 above.

Application server 140 may select user devices 102 according to the applicable order of alerts identified in block 804 (block 808). For example, application server 140 may determine that the applicable order of alerts is a sequential order of alerts based on predetermined attributes associated with user devices 102, such as a service type. Application server 140 may select user devices 102 in a sequential order of television set, computer, and cell phone (e.g., for a video call) if all devices are available. If television set is not registered with network 105 at this time, then application server 140 may select computer as the first user device 102 to deliver the call.

Application server 140 may modify a SIP invite message received from S-CSCF 120 for user devices 102 by inserting a SIP terminal ID header that includes the terminal ID 408 of the selected user device 102 (block 810).

At block 812, application server 140 may send SIP invite message back to S-CSCF 120, from which the original SIP invite message was received, so that S-CSCF 120 may deliver the call to the selected user devices 102 based on included terminal ID 408. If the applicable order of alerts is a parallel order, application server 140 may send SIP invite messages to all available user devices 102, one SIP invite message with the corresponding SIP terminal ID header for each available user device 102. As an implementation option, application server 140 may send a single SIP Invite message with many SIP terminal ID headers, one for each applicable terminal ID 408, or with a single SIP terminal ID header containing all applicable terminal ID 408. When a single SIP invite message is sent by application server 140, S-CSCF 120 may have to fork the single SIP invite message into multiple SIP invite messages, one for each terminal ID. If the applicable order of alerts is a sequential order of alerts, application server 140 may send SIP invite message(s) to the first available user device(s) 102 in the sequential order, and, based on reject message or a lack of response, to other user devices 102 further down the sequential order.

At block 814, application server 140 may receive a 180/183 provisional response and/or a 200 OK final answer in response to the SIP invite message. The response may include the terminal ID header. Application server 140 may distinguish the particular user device 102 that sent the response based on terminal ID 408 included in the terminal ID header. Application server 140 may implement different timers for receiving (SIP) 18x and 200 OK responses.

Figure 9:
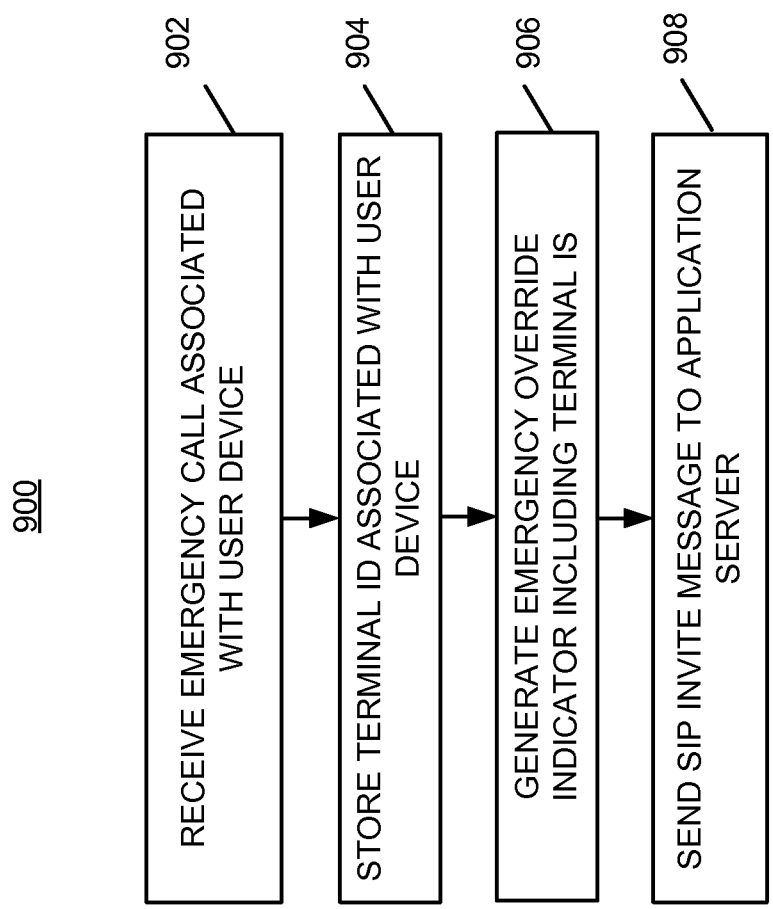
FIG. 9 is a flow diagram illustrating an override of a sequential order based on an emergency override indicator.

FIG. 9 is a flow diagram illustrating an override of a sequential order based on an emergency override indicator. In one implementation, process 900 may be performed by S-CSCF 120. In another implementation, some or all of process 900 may be performed by another device or group of devices, including or excluding S-CSCF 120.

At block 902, S-CSCF 120 may receive an emergency call associated with a user device 102-3. User device 102-3 may have a terminal ID 408.

S-CSCF 120 may store the terminal ID associated with user device 102-3 for a predetermined time after the emergency call (block 904). If S-CSCF 120 receives an incoming call associated with the public user ID that has made the emergency call during the predetermined time (block 906), S-CSCF 120 may generate an emergency override SIP header (block 908). The emergency override SIP header includes the terminal ID 408.

S-CSCF 120 may send a SIP invite message including the emergency override SIP header to application server 140. Application server 140 is to send the SIP invite message to user device 102-3 based on the terminal ID.

Systems and methods described herein may allow network 105 to separate one user device 102 from another user device 102 associated with a single public user ID for a same user to receive call/session termination. Additionally, network 105 may provide extension phone service by alerting all user devices 102 that are available to receive incoming calls. The method may be extended to support different call/session rating and charging based on the user device 102 that receives a particular service.

Systems and methods described herein may be applied in access technologies such as LTE, Enhanced High Rate Packet Data (eHRPD), Wi-Fi, Universal Terrestrial Radio Access Network (UTRAN), evolved UMTS (i.e., Universal Mobile Telecommunications System), evolved Universal Terrestrial Radio Access Network (EUTRAN), wireline access, fiber optic telecommunications, Internet/web access, etc. The system may be applied to a voice over Internet protocol (VoIP) service including at least one of a wireline and wireless user device 102.

The foregoing description provides illustration and description, but is not intended to be exhaustive or to limit the embodiments to the precise form disclosed. Modifications and variations are possible in light of the above teachings or may be acquired from practice of the invention. For example, while series of signal flows have been described with respect to FIG. 5 and series of acts have been described with regard to the flowcharts of FIGS. 7, 8 and 9, the order of the signals flows and acts may differ in other implementations. Further, non-dependent signal flows and acts may be performed in parallel.

Although embodiments described herein in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP standard are examples of protocols that may be used for establishing a communications session among terminals, such as user devices 102, connected to a network. Further, a combination of such protocols may be applied in various parts of the overall system. VoIP call (e.g., audio call, video call, etc.) is used above as an example to illustrate the embodiment, and other types of communication services/sessions, such as short message service (SMS), multimedia messaging service (MMS), rich communication suite (RCS) chat, File transfer, etc., may also be supported by this processes described herein.

Embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
    receiving, at an application server, a session initiation protocol (SIP) invite message including a public user identifier (ID) associated with a user, wherein the public user ID corresponds to a plurality of user devices;
    determining whether the SIP invite message is received during a callback period after a user device of the plurality of user devices has placed a call for emergency services, wherein determining whether the SIP invite message is received during the callback period comprises identifying whether the SIP invite message includes an emergency override indicator associated with the public user ID, wherein the emergency override indicator is generated in association with the call for emergency services;
    in response to determining that the SIP invite message is received during the callback period:
        alerting the user device that placed the call for emergency services; and
    in response to determining that the SIP invite message is not received during the callback period:
        determining an applicable order of alerting at least one of the plurality of user devices based on a type of call or session associated with the SIP invite message and at least one attribute associated with the plurality of user devices;
        identifying at least one available user device associated with the user, based on a terminal identifier (ID) associated with each at least one available user device, wherein a different terminal ID is associated with each at least one available user device;
        selecting a user device from the at least one available user device based on the applicable order of alerting;
        modifying the SIP invite message by inserting a terminal ID header that includes a terminal ID for the selected user device;
        sending the SIP invite message to the selected user device based on the applicable order of alerting; and
        receiving a response to the SIP invite message with the terminal ID.

2. The computer-implemented method of claim 1, wherein determining the applicable order of alerting further comprises:
    alerting all available user devices at an approximate same time.

3. The computer-implemented method of claim 1, wherein determining the applicable order of alerting further comprises:
    alerting a first available user device based on a sequential order of alerts;
    waiting up to a predetermined time for a response from the first available user device; and alerting a next available user device if a rejection or no response is received from the first available user device in the predetermined time.

4. The computer-implemented method of claim 3, wherein the sequential order of alerts is determined based on a predetermined order of alerts.

5. The computer-implemented method of claim 1, wherein the at least one attribute includes at least one of a video capability, a voice call capability, multimedia capability, text capability, or a chat session capability of the at least one available user device.

6. The computer-implemented method of claim 1, wherein the terminal ID includes at least one of a device type of the at least one available user device, an Internet protocol address of the at least one available user device, a unique identifier associated with the at least one available user device, or a unique factor associated with one or more of the at least one available user device.

7. An application server device comprising:
a memory to store a plurality of instructions; and
a processor configured to execute instructions in the memory to:
receive a session initiation protocol (SIP) invite message including a public user identifier (ID) associated with a user, wherein the public user ID corresponds to a plurality of user devices;
determine whether the SIP invite message is received during a callback period after a user device of the plurality of user devices has placed a call for emergency services, wherein, when determining whether the SIP invite message is received during the callback period, the processor is further configured to execute the instructions in the memory to:
identify whether the SIP invite message includes an emergency override indicator associated with the public user ID, wherein the emergency override indicator is generated in association with the call for emergency services;
when the SIP invite message is received during the callback period:
alert the user device that placed the call for emergency services; and
when the SIP invite message is not received during the callback period:
determine an applicable order of alerting for at least one of the plurality of user devices associated with the user based on a type of call or session associated with the SIP invite message and at least one attribute associated with the plurality of user devices;
identify at least one available user device associated with the user based on a terminal identifier (ID) associated with each at least one available user device, wherein a different terminal ID is associated with each at least one available user device;
select at least one user device from the at least one available user device based on the applicable order of alerting;
modify the SIP invite message by inserting a terminal ID header that includes a terminal ID for the at least one selected user device;
send the SIP invite message to each of the at least one selected user device based on the applicable order of alerting; and
receive a response to the SIP invite message.

8. The application server device of claim 7, wherein, when determining the applicable order of alerting for the at least one user device, the processor is further configured to:
alert all available user devices at an approximate same time.

9. The application server device of claim 7, wherein, when determining the applicable order of alerting for the at least one user device, the processor is further configured to:
alert a first available user device based on a sequential order of alerts;
wait a predetermined time for a response from the first available user device; and
alert a next available user device if a rejection or no response is received from the first available user device in the predetermined time.

10. The application server device of claim 9, wherein the sequential order of alerts is determined based on a type of call session and at least one attribute associated with the at least one available user device, and the at least one attribute includes at least one of a video capability, a voice call capability, multimedia capacity, text capability, or a chat session capability of the at least one available user device.

11. A non-transitory computer-readable medium containing instructions, the instructions comprising:
one or more instructions that, when executed by a processor, cause the processor to:
receive a session initiation protocol (SIP) invite message including a public user identifier (ID) associated with a user, wherein the public user ID corresponds to a plurality of user devices;
determine whether the SIP invite message is received during a callback period after a user device of the plurality of user devices has placed a call for emergency services, wherein, when determining whether the SIP invite message is received during the callback period, the one or more instructions further cause the processor to:
identify whether the SIP invite message includes an emergency override indicator associated with the public user ID, wherein the emergency override indicator is generated in association with the call for emergency services;
when the SIP invite message is received during the callback period:
alert the user device that placed the call for emergency services; and
when the SIP invite message is not received during the callback period:
determine an applicable order of alerting for at least one of the plurality of user devices associated with the user based on a type of call or session associated with the SIP invite message and at least one attribute associated with the plurality of user devices;
identify at least one available user device associated with the user based on a terminal identifier (ID) associated with each at least one available user device, wherein a different terminal ID is associated with each at least one available user device;
select at least one user device from the at least one available user device based on the applicable order of alerting;
modify the SIP invite message by inserting a terminal ID header that includes a terminal ID for the at least one selected user device;

send the SIP invite message to each of the at least one selected user device based on the applicable order of alerting; and receive a response to the SIP invite message.

12. The non-transitory computer-readable medium of claim 11, wherein the one or more instructions that cause the processor to determine the applicable order of alerting further comprise:

one or more instructions that cause the processor to alert all available user devices at an approximate same time.

13. The non-transitory computer-readable medium of claim 11, wherein the one or more instructions that cause the processor to determine the applicable order of alerting further comprise:

one or more instructions that cause the processor to:
alert a first available user device based on a sequential order of alerts;
wait up to a predetermined time for a response from the first available user device; and
alert a next available user device if a rejection or no response is received from the first available user device in the predetermined time.

14. The non-transitory computer-readable medium of claim 13, wherein the sequential order of alerts is determined based on a predetermined order of alerts.

15. The non-transitory computer-readable medium of claim 11, wherein the at least one attribute includes at least one of a video capability, a voice call capability, multimedia capability, text capability, or a chat session capability of the at least one available user device.

* * * * *